Patented Oct. 20, 1931

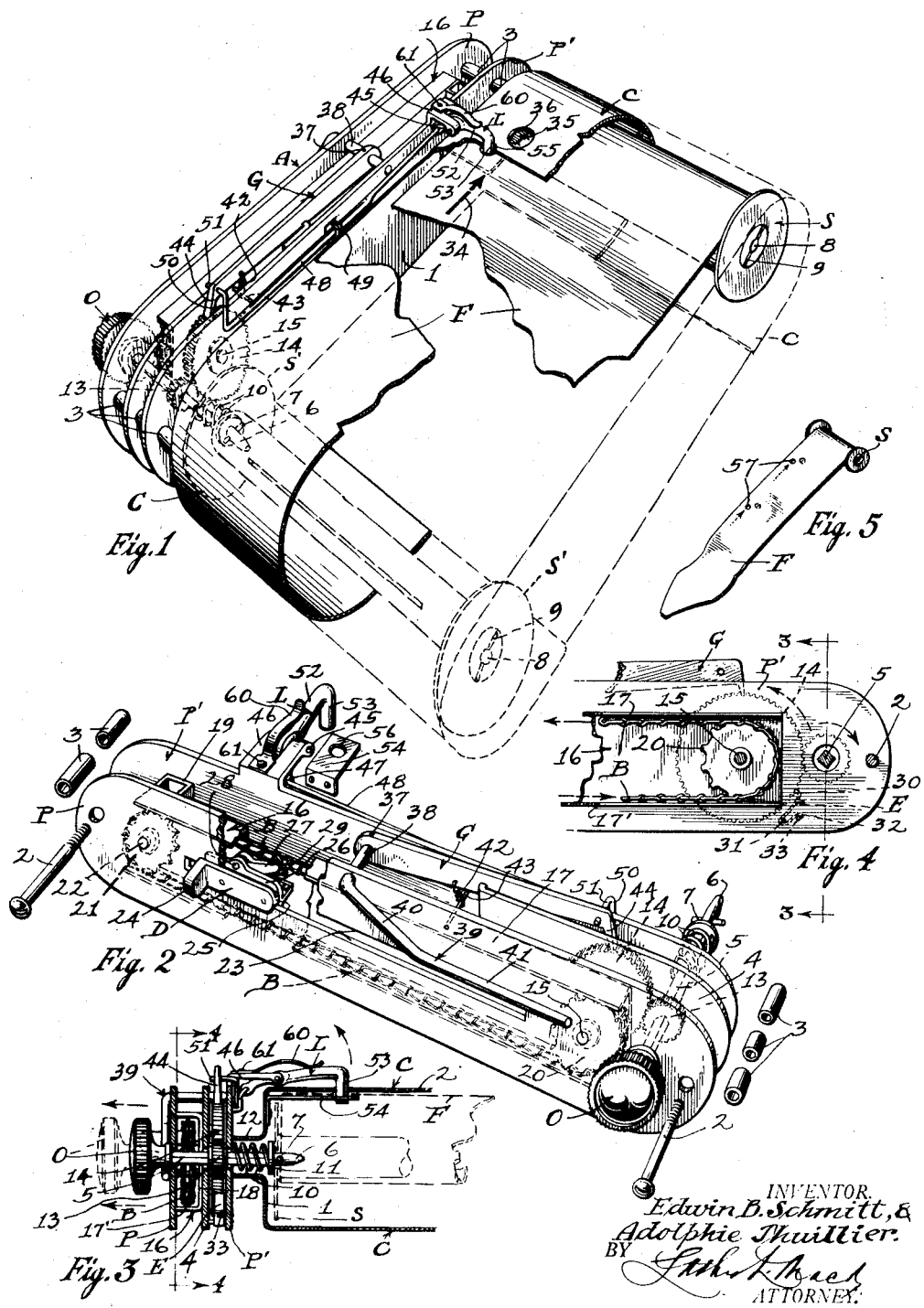

1,828,205

UNITED STATES PATENT OFFICE

EDWIN B. SCHMITT AND ADOLPHIE THUILLIER, OF LOS ANGELES, CALIFORNIA

ACTUATING AND LOCKING MEANS FOR CAMERAS

Application filed July 18, 1927. Serial No. 206,586.

This invention relates in general to cameras for taking still pictures, and more particularly to a mechanism which may be used as an accessory and is readily attachable to an ordinary camera or built into the camera, as may be desired.

The main object of the invention is to provide means adapted to detachably engage one of the spools on which the film is wound, whereby the film may be manually moved into position for successive exposures and locked at the completion of each movement against accidental movement beyond the area of exposure.

Another object is to provide means whereby the film actuating mechanism may be operated in only one direction and permanently held against movement in an opposite direction.

A further object is to provide means cooperating with the film moving mechanism and adapted to engage uniformly spaced perforations in the film, for locking the film against movement at the completion of each operation.

Other objects of invention will appear as the description progresses.

We have shown a preferred embodiment of our invention in the accompanying drawings, in which:

Fig. 1 is a fragmentary perspective view of a camera with our attachment in operative position thereon.

Fig. 2 is a perspective view, partly broken away and dis-assembled, showing the film actuating and locking mechanism.

Fig. 3 is a transverse section of the film actuating and locking mechanism shown in Fig. 1, as seen on line 3—3 of Fig. 4.

Fig. 4 is a sectional elevation of the same on line 4—4 of Fig. 3.

Fig. 5 is a reduced scale perspective view of a strip of film and a spool therefor, showing suitable perforations in the film by means of which the film is locked against incidental movement.

In the drawings, C represents an ordinary camera case, and F the usual film movably mounted therein on the usual spools S and S'.

Our invention includes an actuating mechanism A, attachable to a side 1 of the camera by means of screws 2, 2, etc., which extend through a pair of substantially similar and spaced supporting plates P and P' on which the film actuating and locking mechanism is mounted.

The screws 2, 2, extend through a pair or more of spacers as at 3, 3, for holding the plates P and P' suitably spaced apart. One end of the mechanism is provided with a short plate 4 which is intermediately mounted between the plates P and P' and held in proper position by the spacers 3, 3, etc., on one or more of the screws 2.

One of the spools S' for instance, is arranged to be detachably connected with the usual film operating button O, which is attached externally of the plate P on a preferably square shaft 5, which is lengthened substantially beyond the length of the usual shaft, and has an end portion 6 with a pin 7 therein adapted to engage an aperture as at 8, and a transverse slot as at 9 for turning the film F and the spools S and S', as in usual cases.

Shaft 5 is provided with a coil spring 10 on its inner end which compresses between a fixed collar 11 near the inner end of shaft 5, and the inner side of plate P', as seen in Fig. 3. Said spring may be housed in a circular extension 12 formed on the side 1 of the camera case C.

Intermediate the central plate 4 and the inner plate P', we provide a pinion 13 fixed to and for rotation with shaft 5, and operating button O. Said pinion meshes with and is driven by a relatively larger spur gear 14 which is fixed to a tranverse shaft 15, journaled in the plates P, P' and 4, and operates between the two last mentioned plates.

Intermediate the plates P and P', we provide a channeled member 16 with upper and lower flanges 17 and 17' which are turned outwardly from the plate 4, and a central web 18 connecting said flanges. The channeled member 16 may be suitably secured to the plate 4 and also to the plate P' by means of a suitable bracket or spacer 19, as shown in Fig. 2. Said member 16 serves to enclose a sprocket chain B which operates over sprockets 20 and 21 positioned between the flanges 17 and 17' of the channeled member.

The sprocket 20 is fixed to the shaft 15 adjacent the operating shaft 5, while the sprocket 21 is held on a shaft 22 which is suitably held in the plate P, and the members 16 and 19. Shaft 22 is positioned at a point near the axis of the spool S, but is not connected therewith as said spool S is rotated by the movement of the film F thereon.

It will be observed by reference to Fig. 2 that the outer plate P is provided with a substantially elongated horizontal slot 23, terminating at points inwardly of the shafts 15 and 22, in which a film actuating member D is slidably mounted. Said member D has an outwardly extended finger piece 24, an inwardly horizontal web portion 25 which engages the slot 23, and a right angularly formed bracket 26 either formed on the member D or attached thereto for operably supporting a pawl 27 which is adapted to engage the upper portion of the operating chain B, as shown in Fig. 2.

Said pawl is pivotally held on the pin 28 and is resiliently held in engagement with the chain B by means of a spring 29. The free end of said pawl 27 is formed with a shoulder on one side and a curved edge on the other side thereof, so that when the same is moved forwardly, as shown in Fig. 2, the pawl will move under the upper portion of chain B without moving the same, but when the member D and the pawl 27 are moved rearwardly, the pawl will engage a link of the chain and serve to rotate the shafts 15 and 22 correspondingly, together with the spools S and S' and film F.

The length of the slot 23 is exactly sufficient to permit of the movement of member D and chain B for a sufficient distance so as to successively position different exposure areas on the film F before the links.

Referring to Fig. 4, it will be observed that we have provided a detent E which may be in the form of a flat spring, as shown, or otherwise. Said detent is provided with an upper end portion 30 adapted to engage the teeth of the gear 14, and a central portion of member E is pivotally mounted on a pin 31 in the plate P', while the opposite end 32 of said member rests against a pin 33. Member E thus serves to prevent the rotation of the gear 14, sprockets 20 and 21 and chain B in a clockwise direction, as seen in Fig. 2, but is arranged to permit the operation of said elements in a counter-clockwise direction.

Movement of gear 14 in a counter-clockwise direction, which is effected by moving the actuating member D rearwardly as seen in Fig. 2, causes the shaft 5, spools S and S' and film F to move in a clockwise direction and oppositely to the direction indicated by the arrow 34 on the film in Fig. 1. Said arrow is provided on the film so that as the film moves forwardly as seen in Fig. 1, approach of the numeral 35 which is provided on the film may be observed in an aperture 36 in the camera case C. One of the film exposure areas is properly positioned before the lens when the numeral 35 is centrally positioned beneath the aperture 36.

The shafts 5, 15 and 22 and chain B are normally held stationary by means of a latch G which is fixed by means of a pin 37 or otherwise to a transverse portion 38 of a rod 39, which may be pivotally mounted in the plates P and P'. Rod 39 has a downwardly bent rear portion 40 and a forwardly bent straight portion 41 substantially paralleling the plane of the slot 23 in plate P. The latch G and rod 39 are normally held in the position shown in Fig. 2 by means of a spring 42 which is connected at opposite ends with the body of the member G, and a pin 43 mounted on and between the plates P and P'.

The forward end of member G is provided with a pawl portion 44 which engages the teeth of the gear 14 so as to normally prevent the movement of said gear in a counter-clockwise direction. Members G and 39, however, are raised upwardly so as to disengage the pawl 44 from gear 14 when the member D is moved forwardly and under the straight portion 41, the movement of said member D serving to elevate the portion 40 of member 39 and the member G simultaneously and to hold said members upwardly during a substantial portion of the succeeding rearward movement of member D.

Our mechanism includes a locking member L in the form of a bell crank, which is centrally pivoted on a pin 45 held in a bracket 46, either attached to or formed on the inner plate P', and extending inwardly therefrom over the case C of the camera. Member L has a depending arm 47 which connects with the inner end of a bar or rod 48, having a fulcrum on the inner plate P' within a stirrup 49. The forward end of the rod 48 is bent upwardly at 50 and thence outwardly at 51, where it extends through the forward end of the latch bar G.

Thus, when the member G is elevated by means of the actuating member D, the forward end of rod 48 will be also operated, while the rear portion of member 48 will move downwardly. This movement of the member 48 effects the raising of the inwardly extended arm 52 on the member L, and also of the depending end portion 53 thereof.

Internally of the case C, we provide an angle bracket 54, suitably attached to the side 1 thereof and spaced from the upper portion of the case, so that the film F may move between the member 54 and the top of the case. The depending portion 53 of member L is operatively held in a perforation 55 in case C and a perforation 56 in the member 54, which register with the perforation in the case.

Said member L is also adapted to engage, successively, perforations 57 which are formed in the film F at uniformly spaced points and at one side thereof. The function of the member L is to positively lock the film F against movement, while an exposure is being made or during the period of time between exposures, and the member L is connected with the member G so as to time the operation of the member L with the chain B and the member D, as hereinafter described.

In operation, the mechanism is at rest when the member D is positioned at its rear extreme of movement, namely, at the rear end of the slot 23. At such time one of the numerals 35 will register with the aperture 36 in the case C and the corresponding exposure area on the film F will be properly positioned before the lens for the taking of a still picture.

When it is desired to move an exposed portion of the film out of registration with the lens, and a succeeding unexposed portion into registration therewith, the member D is moved forwardly to the forward end of slot 23, and during the last portion of the movement of said member the rod and 14, sprockets 20 and 21 and chain B, spools S and S', and the movement of the film F forwardly as seen in Fig. 1, until a succeeding numeral 35 is moved into registration with the aperture 36 in the case C, and the member D is positioned at its rear extreme of movement.

During the movement of film F the lock L and the pawl 44 are held upwardly and out of engagement with the film and the gear 14, respectively, and against the tension of spring 43, but when a succeeding film has been moved into position for exposure, one of the apertures 57 in the film will register with the apertures 55 in case C and 56 in the bracket 54, so that the portion 53 of lock L may drop into the aperture of the film and lock the same against accidental movement.

The lock L may be independently provided 39 will be actuated by frictional engagement with the upper edge of member D, and the pawl 44 on member G will be disengaged from gear 14. When member D is moved as stated, the pawl 27 will freely move under the upper portion of chain B and assume a position of engagement with one of the links of said chain above the forward terminal of slot 23, in readiness for a succeeding movement of the film.

The movement of member D does not effect the rotation of gears 13 and 14, or of the spools S or S' or film F, due to the engagement of the detent E with the gear 14. The ensuing rearward movement of member D, however, will effect the rotation of gears 13 with a flat spring, as at 60, which may be attached at 61 to the upper surface of the bracket 46 if the spring 43 is insufficient to effect the proper operation thereof.

It will thus be observed that we have provided a novel and useful attachment for cameras, whereby the movement of the film may be controlled automatically and locked against accidental movement or displacement from position and exposure.

While we have shown but one form of a device embodying our improvements, we believe it to be possible to substantially modify the structure shown within the scope of the appended claims without departing from the spirit of our invention.

What we claim is:

1. In a camera arranged for moving a film successively into position for exposing different portions thereof, a shaft on which one of the film spools is mounted, a pinion on said shaft, a pair of sprocket shafts, a gear on one of said sprocket shafts in mesh with said pinion, a pair of sprockets secured respectively on said sprocket shafts, a chain extending over said sprockets, a slide, a pawl on said slide for engaging said chain when the slide is moved in one direction for causing said chain, sprockets, gear, pinion and shaft on which said film spool is mounted, to advance the film for taking another picture, and means for locking one of said sprocket shafts against rotation when the film is advanced.

2. In a camera arranged for moving a film successively into position for exposing different portions thereof, a shaft on which one of the film spools is mounted, a pinion on said shaft, a pair of sprocket shafts, a gear on one of said sprocket shafts in mesh with said pinion, a pair of sprockets secured respectively on said sprocket shafts, a chain extending over said sprockets, a slide, a pawl on said slide for engaging said chain when the slide is moved in one direction for causing said chain, sprockets, gear, pinion and shaft on which said film spool is mounted, to advance the film for taking another picture, a pawl for engaging said gear and locking the same when said film is in position to be exposed, and a cam arm to be engaged by said slide to cause said pawl to disengage said gear when the slide is moved to advance the film.

3. In a camera arranged for moving a film successively into position for exposing different portions thereof, a shaft on which one of the film spools is mounted, a pinion on said shaft, a pair of sprocket shafts, a gear on one of said sprocket shafts in mesh with said pinion, a pair of sprockets secured respectively on said sprocket shafts, a chain extending over said sprockets, a slide, a pawl on said slide for engaging said chain when the slide is moved in one direction for causing said chain, sprockets, gear, pinion and shaft on which said film spool is mounted, to advance the film for taking another picture, said film being provided with openings along one edge, a frame and an arm held on said frame and controlled by the movement of said slide for engaging said openings respectively for locking the film each time in position for exposure.

4. In a camera arranged for moving a film successively into position for exposing different portions thereof, a shaft on which one of the film spools is mounted, a pinion on said shaft, a pair of sprocket shafts, a gear on one of said sprocket shafts in mesh with said pinion, a pair of sprockets secured respectively on said sprocket shafts, a chain extending over said sprockets, a slide, a pawl on said slide for engaging said chain when the slide is moved in one direction for causing said chain, sprockets, gear, pinion and shaft on which said film spool is mounted, to advance the film for taking another picture, a pawl for engaging said gear and locking the same when said film is in position to be exposed, and a cam arm to be engaged by said slide to cause said pawl to disengage said gear when the slide is moved to advance the film, said film being provided with openings along one edge, an arm formed with an engaging end, and means connecting said pawl and said arm for causing said engaging end to engage said film openings respectively for locking the film each time in position for exposure.

EDWIN B. SCHMITT.
ADOLPHIE THUILLIER.